United States Patent [19]

Kraus

[11] Patent Number: 4,881,705
[45] Date of Patent: Nov. 21, 1989

[54] PLASTIC HOLDING ELEMENT

[75] Inventor: Willibald Kraus, Grunstadt, Fed. Rep. of Germany

[73] Assignee: TRW United Carr GmbH, Alsenborn, Fed. Rep. of Germany

[21] Appl. No.: 169,417

[22] Filed: Mar. 17, 1988

[30] Foreign Application Priority Data

Mar. 18, 1987 [DE] Fed. Rep. of Germany ....... 3708864

[51] Int. Cl.$^4$ ................................................. F16L 3/12
[52] U.S. Cl. .................................... 248/74.2; 248/68.1
[58] Field of Search ...................... 248/68.1, 74.2, 71, 248/74.4, 74.5, 74.1, 72, 73, 69, 65

[56] References Cited

U.S. PATENT DOCUMENTS

| | | | |
|---|---|---|---|
| 2,279,865 | 4/1942 | Ellinwood | 248/71 X |
| 2,683,578 | 7/1954 | Rainey | 248/68.1 |
| 3,054,587 | 9/1962 | Hekenstreit et al. | 248/74.1 |
| 3,995,795 | 12/1976 | Hogan | 248/68.1 |
| 4,198,812 | 4/1980 | Hennig et al. | 248/68.1 |
| 4,564,163 | 1/1986 | Barnett | 248/71 |

FOREIGN PATENT DOCUMENTS

| | | | |
|---|---|---|---|
| 2754697 | 7/2978 | Fed. Rep. of Germany | 248/74.1 |
| 2248432 | 5/1975 | France | 248/74.2 |
| 2280013 | 2/1976 | France | 248/74.1 |

Primary Examiner—Alvin C. Chin-Shue
Attorney, Agent, or Firm—Fay, Sharpe, Beall, Fagan, Minnich & McKee

[57] ABSTRACT

The disclosed invention relates to a plastic holding element especially intended for the fastening of at least one pipe or tubular member to a support structure. The element includes a bearing portion 3 for the pipe and an attaching portion 2 for connecting to the support. The bearing portion 3 of the holding element has at least one zone of material softer than the plastic of the body of the holding element. The softer material is joined to at least one surface of the bearing portion 3 by a two shot injection molding process. The bearing portion 3 may be designed either in the form of individual nodes 4 or in the form of inlays (7, 13 and 7', 13').

7 Claims, 3 Drawing Sheets

PLASTIC HOLDING ELEMENT

BACKGROUND OF THE INVENTION

The invention relates to a plastic holding element, especially intended for the fastening of at least one pipe or tubular element to a support structure. The holding element comprises a bearing portion for the pipe or tubular element and a connecting portion for attaching the element to the support.

Already known as general state of the art is the use of such holding elements for the mounting of power and braking lines in the motor vehicle industry. Such lines are supported in resilient rubber mounting components which must be connected through suitable fasteners, at great expense, to the corresponding vehicle body parts. In this prior art case, the fastener part, typically a plastic component, and the rubber mounting part are supplied as separate, independent components.

The mounting sequence for this prior art assemblage requires several steps. On the body of the motor vehicle, fastening points of any of several types are provided. For example, these may be in the form of smooth pegs, threaded or profiled bolts of any of several types, so-called T bolts, specially shaped openings in the vehicle body or frame, or even in the form of glue connections. The lines or pipes which are to be fastened at these fastening points are provided with a rubber mounting. Then the corresponding line with the rubber mounting in position is placed with the aid of a fastener clip at the respective fastening point. A further difficulty is encountered when, oftentimes, two limes must be mounted in parallel. It is also difficult to bring or adjust the rubber mounting part to the correct operating position relative to the fastening point. For this mounting, depending on the length of the line, two fastener clips are needed.

The problem of the present invention is to design a construction of the kind mentioned so that, with simple structure, an important facilitation of mounting is given.

BRIEF STATEMENT OF THE INVENTION

This problem is solved, according to the invention, by the fact that the bearing portion of a plastic holding element or fastener clip is provided with at least one zone of material softer than the plastic of the main body of the holding element. The softer material is joined to at least one surface of the bearing portion in a two-component injection molding process. In this way there is advantageously produced a holding element consisting of two different materials. This produces a considerable facilitation of mounting. The whole system may be fastened or premounted at the corresponding fastening point, after which the corresponding lines or pipes can be clipped in and fastened in place through an integral cover. The plastic of the holding element may be any conventional structural plastic such as a polyamide or polyoxymethylene-polyacetal, while the softer material may be of a plastic having resiliency and characteristics similar to rubber.

According to one embodiment of the invention, it is possible to place in the bearing portion several raised nodes or protrusions which extend parallel to the longitudinal axis of the pipe to be mounted. These protrusions are, of course, comprised of the softer material.

In another embodiment of the invention, the bearing portion may have at least one inlay of softer material fastened through at least one connecting element to one surface of the bearing zone. In this case, the corresponding inlay may have at least one through opening in order to increase it resiliency and assure a certain damping of noise and vibrations with good support of the lines.

In another embodiment of the invention, the holding element may have a bearing portion which consists of a base part and a cover part. The cover part may have at least one inlay. This inlay may, in turn, be provided with through openings. It is possible to divide these through openings into individual chambers by the use of stays. Through the special shaping of the bearing portion with the inlay it is possible to reliably hold, in a simple way, even pipes of different diameter. By the shape of the inlays alone, the different diameters of the pipes to be supported can be taken into account. By the shape of the inlays alone the device has the ability to support tubes of different diameters without the need of changing the holding element as to its bearing portion and its holding portion. Because of this there may also advantageously be obtained a considerable reduction in the necessary inventories for the elements since even for pipes of different diameter, the same construction components in the form of base parts and cover parts, which together form the bearing portion, may be used.

BRIEF DESCRIPTION OF THE DRAWINGS

The above and other objects and advantages will become apparent from the following description when read in conjunction with the accompanying drawings wherein:

Referring more particularly to the drawings wherein the showings are for the purpose of illustrating preferred embodiments of the invention only, and not for the purpose of limiting same, FIG. 1 shows a molded plastic holding element 1 comprising an attaching portion 2 with bearing portions 3 and 3' on each side thereof. The bearing portions 3 and 3' are comprised in each case of an outer shell 5 wih an inner shell 6 arranged concentrically therewith. The bearing portions 3 or 3' of the holding element 1 each have at least one zone of material softer than the plastic which constitutes the main body of holding element 1. In the example of FIG. 1, this zone of softer material comprises of individual cylindrical protrusions or nodes 4 arranged to extend parallel to the longitudinal axis of the pipe to be mounted. The application of the protrusions 4 takes place in a two-component injection molding process, known per se, by which two different material can be joined together within a die. The holding element 1 consists, in this case, of the plastic polyoxymethylene-polyacetal or polyamide, often used in the auto industry. Onto the corresponding zone, inside the inner shell 6, is molded a softer material in the form of nodes 4. These nodes 4 advantageously improve the gripping and prevent slipping of the pipes (not shown in detail).

Figure 1:
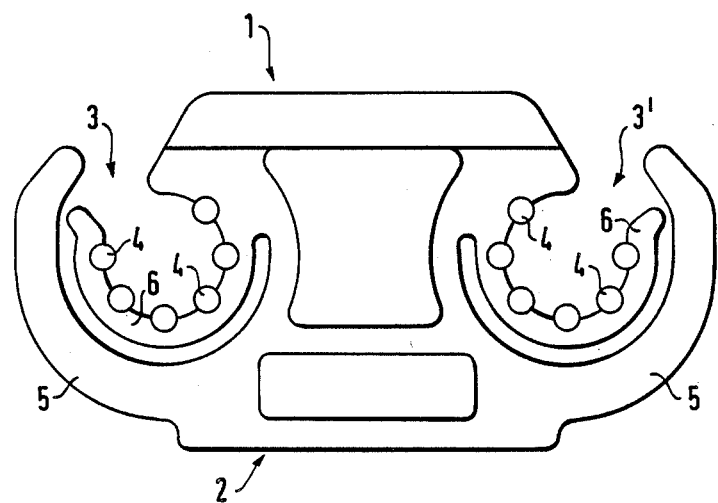
FIG. 1 is a front elevational view of a holding element for the mounting of two pipes.

In the example according to FIGS. 2 to 6, the holding element 1' also comprises a bearing portion 3 and an attaching portion 2. The bearing portion 3 is comprised of a base part 11 and a cover part 12. The cover part 12 is connected in one piece, through an integral hinge 33, with the base part 11. The base part 11 has a recess 15, while the cover part 12 has a resilient catch projection 16 adapted to cooperate with the recess 15. With this, it is possible, by bending the hinge 33, to bring the cover part 12 into closed position. In this position the projection 16 lockingly engages in the latch defined by recess 15, and the whole arrangement is thus locked closed.

In a form of execution not shown in detail, it is also possible to provide, in the zone of the hinge, another recess, lying opposite the first recess, which gives the advantage that, with breaking of the hinge, the cover part 12 remains perfectly joined with the base part 11.

The base part 11 and the cover part 12 have, in each case, an inlay, 7 and 13, respectively. The inlays 7 and 13 are fastened to the base part and the cover part, respectively, through connecting elements shown in detail in FIGS. 4 and 5. The fastening takes place, again, in the above-mentioned two-component molding process. The inlays 7 and 13 are comprised in each case of a plastic material, having characteristics similar to rubber, softer and more resilient than the material of the main body of the holding element 1'.

To assure a good support and a damping of sound and vibrations of the pipes 17 and 18, the inlays 7 and 13 are provided with openings or recesses 10 and 14, respectively. In the closed position of the cover part 12 the locking of the catch projection 16 in relation to the recess 15 causes the pipes 17 and 18 to be imbedded in the corresponding inlays 7 and 13.

Figure 6:
FIG. 6 is a cross-sectional view taken along line VI—VI in FIG. 2.
Figure 3:
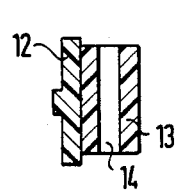
FIG. 3 is a cross-sectional view taken along the line III—III of FIG. 2.

In FIGS. 3 and 6 it is seen that the corresponding recesses 10 and 14, extend completely through the whole inlays, 7 and 13, respectively.

Figure 4:
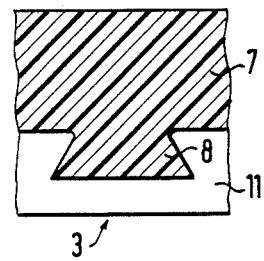
FIGS. 4 and 5 are partial cross-sectional views illustrating two different possibilities of connecting elements.
Figure 5:
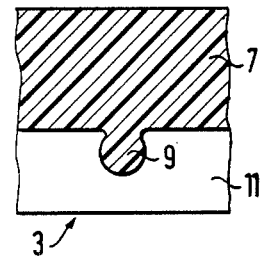

The elements which connect the inlays to the base part and cover part may, according to FIG. 4, be in the form of trapezoidal openings 8 or, according to FIG. 5, in the form of spherical openings 9. Other constructive shapings of the connecting elements are also possible, in which in each case it must be assured that the inlays 7 and 13, respectively, are held reliably against the base part 11 and the cover part 12. Another possibility of shaping the connecting elements is that they may have the form of stays in any desired profiling.

The holding elements 1', with base part 11 and cover part 12, may have the identical size and form of construction for the holding of different diameters of pipe. Through the corresponding shaping of the inlays 7 and 13 alone, it is possible to reliably support and hold even pipes of different diameter in the holding element 1'.

Figure 2:
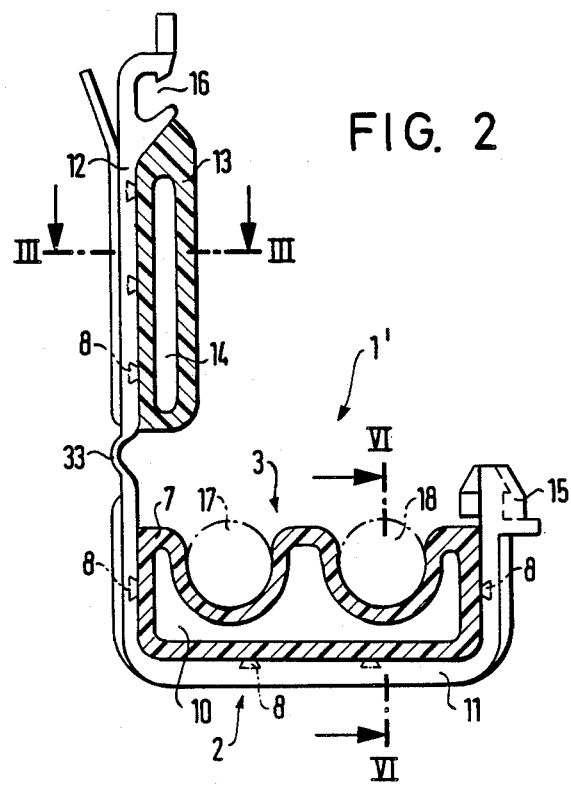
FIG. 2 shows a front elevational view of another embodiment of a holding element having a base part and a cover part.

For mounting, the holding element 1' as shown in FIG. 2 is fastened through the attaching portion 2 to a support base or structure not shown in detail. Thereafter pipes 17 and 18, or even electrical wiring, may be positioned in the inlays 7 which, by closing the cover part 12, and locking, through the recess 15 and the projection 16, the mounting is completed.

Figure 7:
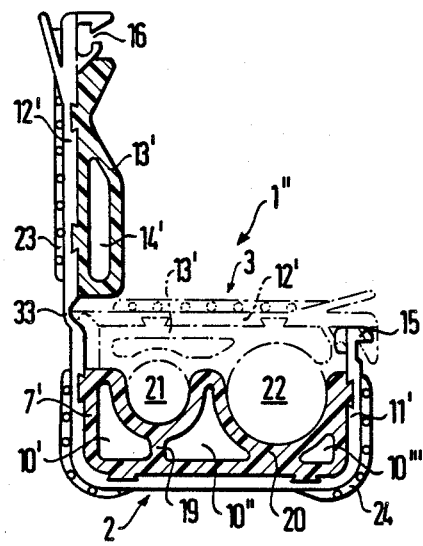
FIG. 7 shows another embodiment of the invention, in front elevational view, with the cover part closed.
Figure 8:
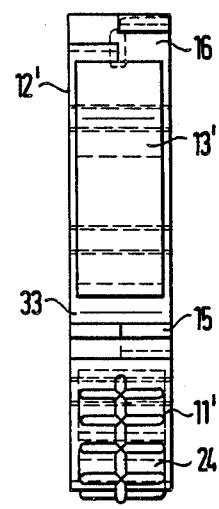
FIGS. 8 is a right side view of the construction shown in FIG. 7.

FIGS. 7 and 8 show another embodiment of the invention. Here, the holding element 1" is again comprised of an attaching portion 2 and a bearing portion 3. The bearing portion 3 is comprised of a base part 11' and a cover part 12'. In the base part 11' and in the cover part 12' there is, in each case, an inlay 7' and 13', respectively, fastened through connecting elements as shown in FIGS. 4 and 5.

In the embodiment of FIGS. 7 and 8, the openings or recesses 14 nd 10' are shaped differently than in FIG. 2. Here, the through openings are divided into individual chambers 10', 10" and 10''', through stays 19 and 20 within the inlay 7'. The opening 14' is also differently shaped than 14 in FIG. 2; the through opening 14' extends only through a certain zone of the inlay 13' and is so shaped in the front zone that its outer circumference strikes against the surface of a pipe 22, shown diagrammatically.

In the form according to FIGS. 7 and 8 it is possible merely by the shaping of the inlays 7' and 13', to reliably support two pipes 21 nd 22 of different diameter, in the holding element 1", and to fasten them with damping of noise and vibration. Also, in this embodiment the cover part 12' has a catch projection 16 and the base part 11' a corresponding latch recess 15. As shown in dashed lines, the cover part 12' can be joined in this way with the base part 11', while the corresponding zone of the inlay 13' strikes against a part of the outer wall of the pipes 21 and 22.

In the form shown in FIGS. 7 and 8, it is also possible to provide the base part 11' and the cover part 12', at least in zones, with an inlay, 22 and 34, respectively. The inlay may, of course, be of a different composition of material than the main body of holding element 1'. With this, there can be obtained, in a simple way, protection from stone impacts and premature wear. It is also possible for these inlays to be comprised, for example, of the same material as the holding element 1'. Reinforcing ribs might also be provided on these inlays. It is also possible, in an embodiment not shown in detail, to prepare the inlays of a softer material and then join them, through suitable connecting elements, with the base part 11' and/or the cover part 12'.

Again, in this form of construction, it is possible to support pipes of different diameter, merely by changing the form of the inlays 7' and 13' and adapting these to the shape of the pipe to be held. The base part 11' and the cover part 12' can be left unchanged. Here also, there is given an advantageous simplification in the bearing portion.

Both in the form according to FIG. 2 and in that of FIG. 7, and 13 and 13', joined through the corresponding connction points 8 and 9, respectively, with the base part 11 or 11' and the cover part 12 or 12', need to be adapted to the pipe to be held. This is a great advantage, both as to support and as to cost.

In FIGS. 9a to 9e there are shown several possibilities of shapng the attaching portion 2 of the holding elements 1, 1' and 1", shown in FIGS. 1, 2 and 7. According to FIG. 9a, the attaching portion 2 may be comprised for example, of a base 25 with two elastic wings lying opposite each other, above which is arranged an elastic sealing disc 32. Between the under side of this sealing disc 32 and the upper edge of each elastic wing 26 and 27 may receive a support having a suitably shaped opening, through which the holding element is reliably fastened to it.

Figure 9A:
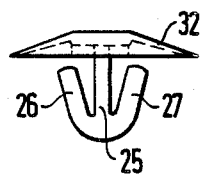
FIGS. 9a–9e show different forms of attaching portions for joining the holding element to associated support structure.
Figure 9B:
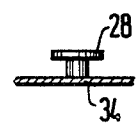

In the form according to FIG. 9b, a T bolt 28 is joined to a support 34 and the attaching portion 2 of the holding element has a corresponding opening which allows it to be joined to the T bolt.

Figure 9C:
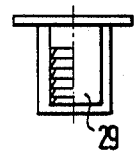

In the form according to FIG. 9c, a specially shaped holding part 29 is used. This is a known type of part and is provided with a number of ribs, arranged parallel, one after the other, which can be received on a profiled bolt, not shown in detail, joined on a support.

Figure 9D:
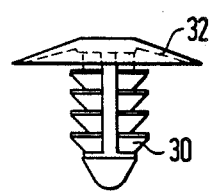

The form according to FIG. 9d consists of a bolt part 30 with a sealing plate 32 and several conical elements. This allows connecting the part 30 into an opening (not shown in detail) of a support, and thus the fastening of the respective holding element to the support.

Figure 9E:
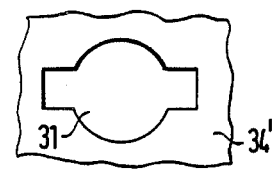

According to FIG. 9e, a support 34' has also a specially shaped opening 31, while the holding zone 2 of the respective holding element has a corresponding shaped form, in order to allow it to be fastened securely into this opening 31.

In each case, there is given a holding element, 1 or 1' or 1", which is comprised of two materials, joined by a two-component molding process, to provide the respective bearing zone of the holding element with a zone of softer material. In this way is given a construction unit which contributes importantly to facilitating the mounting of sound and vibration damped lines and pipes, for example, of power and braking lines.

What is claimed is:

1. A plastic holding element mounting at least one tube member on a support, comprising a relatively rigid moulded plastic body having a tube bearing portion and a mounting portion for attaching the body to a support, the holding element bearing portion having at least one inlay defining a tube engaging surface formed of softer material than the plastics of the holding element, characterized in that the inlay (7,7';13,13') is formed of softer and less rigid material than the plastics of the holding element and that the inlay is permanently connected and bonded to a surface of the bearing portion (3,3') through at least one key type connecting element (8;9) by being directly moulded to said connecting element and said surface by a two component moulding process.

2. A holding element according to claim 1 characterized in that the inlay (7) has at least one recess opening (10).

3. A holding element according to claim 1 wherein said bearing portion comprises a base part and a cover part connected therewith through a hinge, characterized in that the base part (11,11') and the cover part (12,12') are provided with an inlay (7,7';13,13'), respectively.

4. A holding element according to claim 3, characterized in that the inlays (7;13) of the cover part (12) and the base part (11) have an opening (10,14) passing therethrough, respectively.

5. A holding element according to claim 4, characterized in that the inlays (7,13') of the cover part (12') have several chamber-like openings (10',10",10''') separated from each other by stay members (19,20).

6. A holding element according to claim 3, characterized in that the inlays (7,13') in the base part (11') and in the cover part (12') are designed for different diameters of tubes (21,22).

7. A holding element according to claim 6, characterized in that the base part (11') and the cover part (12') are provided at least on certain portions of the exterior with an inlay (23;24).

* * * * *